Oct. 25, 1938.                C. E. BRADSHAW                2,134,595
                            TRAILER CONSTRUCTION
                           Filed Oct. 27, 1936              4 Sheets-Sheet 2

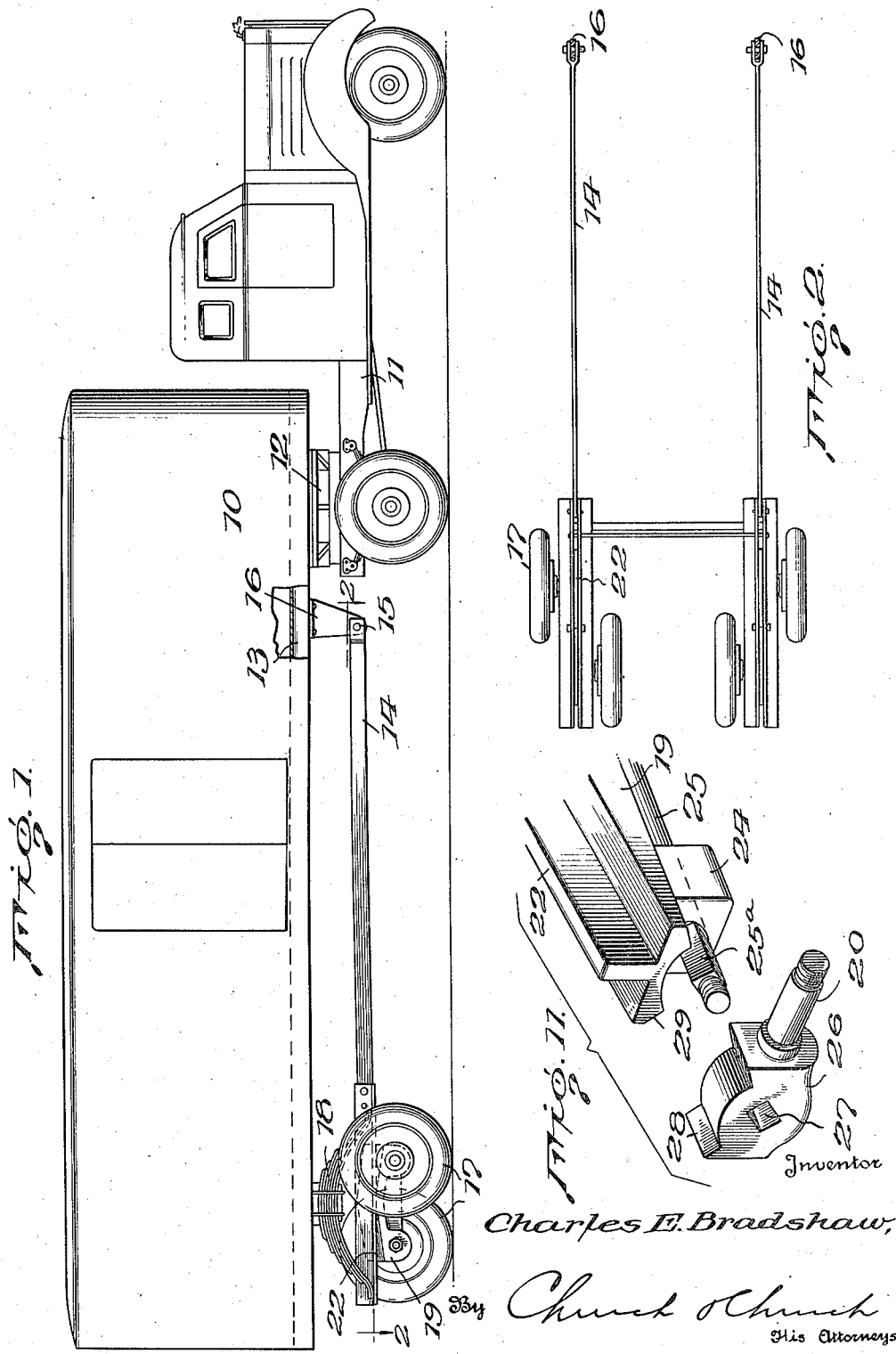

Inventor
Charles E. Bradshaw,
By Church & Church
His Attorneys

Oct. 25, 1938.   C. E. BRADSHAW   2,134,595
TRAILER CONSTRUCTION
Filed Oct. 27, 1936   4 Sheets-Sheet 3

Inventor
Charles E. Bradshaw,

By Church & Church
His Attorneys

Oct. 25, 1938.   C. E. BRADSHAW   2,134,595
TRAILER CONSTRUCTION
Filed Oct. 27, 1936   4 Sheets-Sheet 4
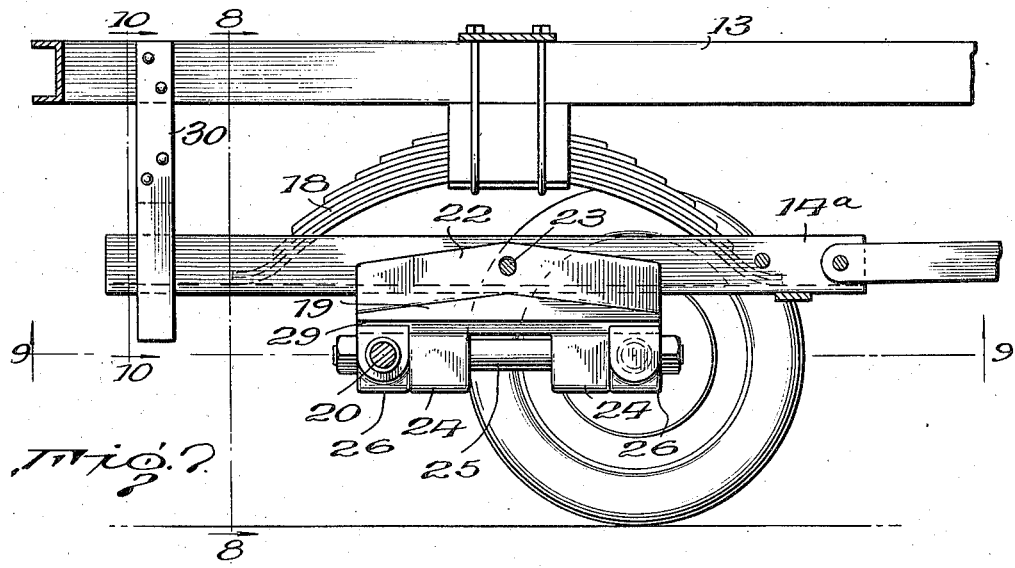
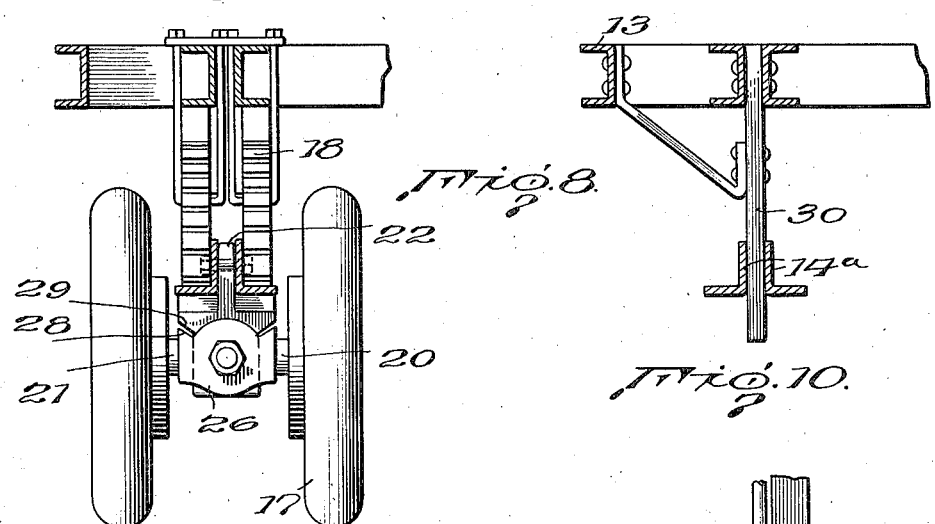
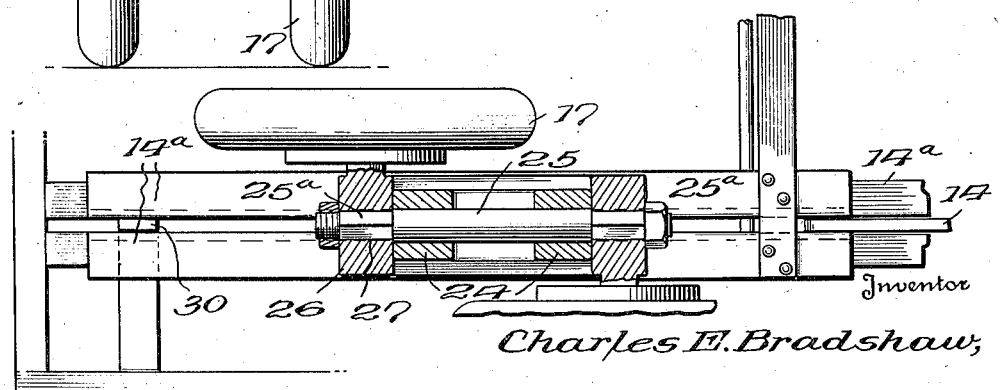
Inventor
Charles E. Bradshaw
By Church & Church
His Attorneys Patented Oct. 25, 1938

2,134,595

UNITED STATES PATENT OFFICE 2,134,595

TRAILER CONSTRUCTION

Charles E. Bradshaw, Wellville, Va., assignor of one-third to Charles Martin, Wellville, Va.

Application October 27, 1936, Serial No. 107,873

5 Claims. (Cl. 280—81)

This invention relates to vehicle construction and, particularly, to the construction of trailer vehicles.

It has heretofore been customary to attach trailers to their draft vehicle or their so-called tractor by a universal connection whereby the forward end of the trailer will maintain its equilibrium under ordinary road conditions. The present invention, however, seeks to provide a trailer in which the rear end of the vehicle, as well as the forward end, will substantially maintain its equilibrium under ordinary road conditions.

Another object of the invention is to provide a ground wheel mounting for trailers which will permit the use of a trailer body of increased width without endangering the balance or equilibrium of the vehicle under ordinary running conditions.

A still further object is to provide an auxiliary frame or underframe, supported at its rear end on ground wheels, a substantially universal action being provided between said underframe and wheels, the main frame of the trailer body being yieldingly supported on said underframe.

A still further object of the invention is to provide a mounting for the ground wheels of the trailer which will minimize lateral stresses imposed on said wheels when the direction of travel of the trailer is altered, as when traveling curves or winding roads.

With these and other objects in view, the invention consists in certain details of construction and combinations and arrangements of parts, all as will hereinafter be more fully described and the novel features thereof particularly pointed out in the appended claims.

In the accompanying drawings—

Figure 1 is a side elevational view of a tractor and a trailer connected thereto, the mounting of the trailer body being constructed according to the present invention;

Fig. 2 is a top plan view of the so-called underframe on which the trailer body is mounted, said view being taken on the line 2—2 of Fig. 1;

Fig. 7 is a side elevational view, partly in section, illustrating a modified form of block on which the wheels are journaled;

Fig. 8 is a transverse vertical sectional view on the line 8—8 of Fig. 7;

Fig. 9 is a horizontal sectional view on the line 9—9 of Fig. 7, the view being taken looking in the direction of the arrows;

Fig. 10 is a vertical sectional view on the line 10—10 of Fig. 7; and

Fig. 11 is a detail perspective view illustrating one end portion of the wheel block and the manner in which the axle for one of the wheels is mounted on said block.

Figure 3:
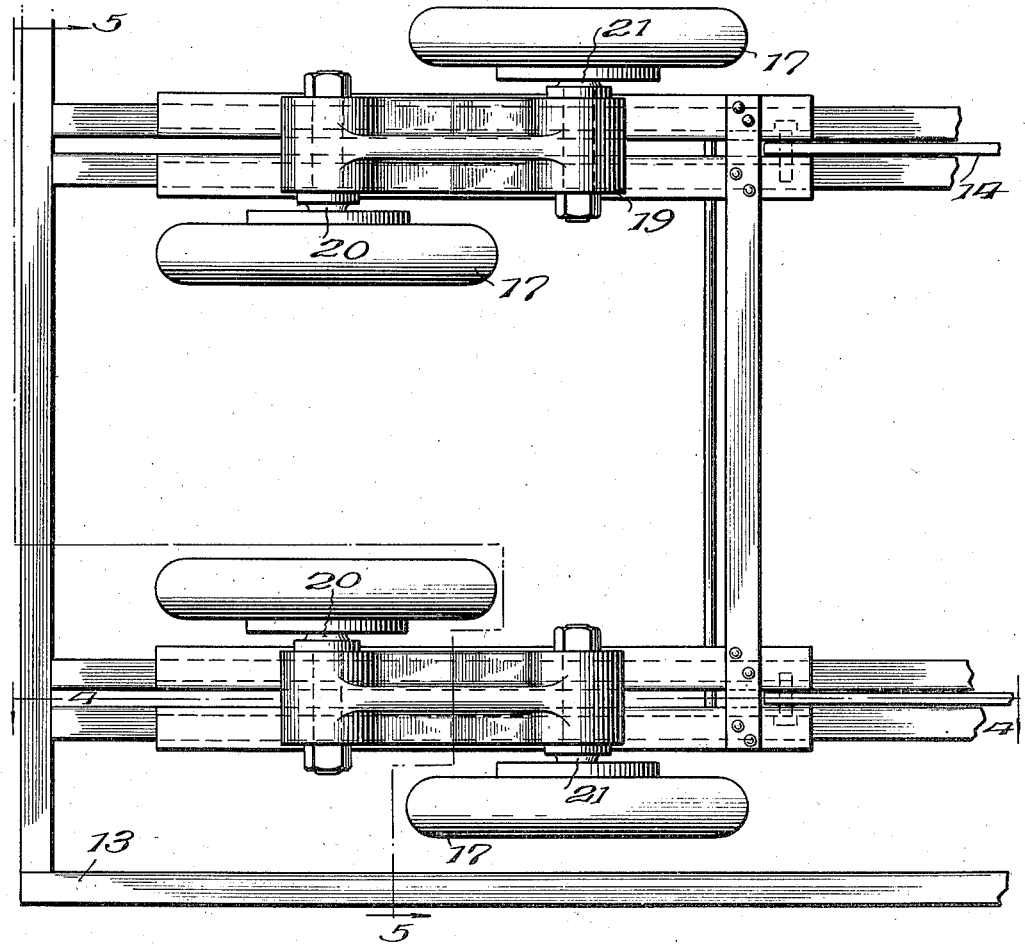
Fig. 3 is a bottom plan view of the rear portion of the underframe, illustrating the mounting of the wheels of the truck at the rear of the trailer.

In accordance with the usual practice, the forward end of the trailer body 10 is connected by a universal coupling, of the ordinary fifth wheel type, to the tractor 11. This universal connection between the trailer and tractor is indicated at 12, and may be of any desired construction, although in the present instance it is shown as being of the type disclosed and claimed in applicant's Patent No. 2,053,812, dated September 8, 1936. In the present instance, the trailer comprises a main frame 13 and a supplemental frame composed of articulated sections 14, 14ª, and which, for convenience, will be referred to as the "underframe". It is intended that the main frame 13 and underframe 14 be capable of moving relatively to one another. For instance, the front section 14 of the underframe may be pivoted, as indicated at 15, on brackets 16, dependent from the main frame, and its rear section 14ª is supported on a truck on which the ground wheels 17 are journaled. The main frame of the trailer is yieldingly supported on the underframe by springs 18, so that one or both sections of the underframe may move up and down independently of the main frame.

Figure 6:
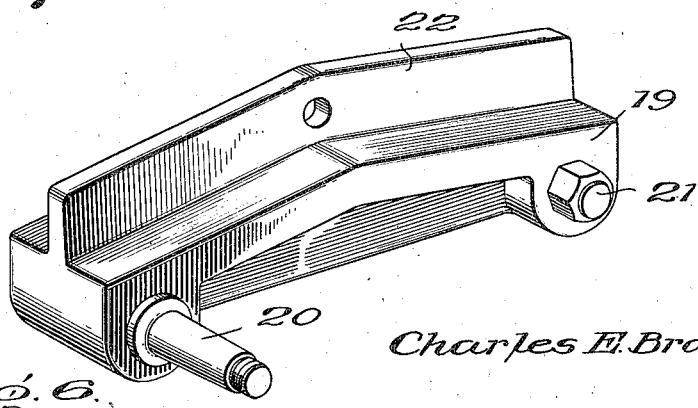
Fig. 6 is a detail view illustrating, in perspective, the block on which the trailer wheels are journaled.
Figure 4:
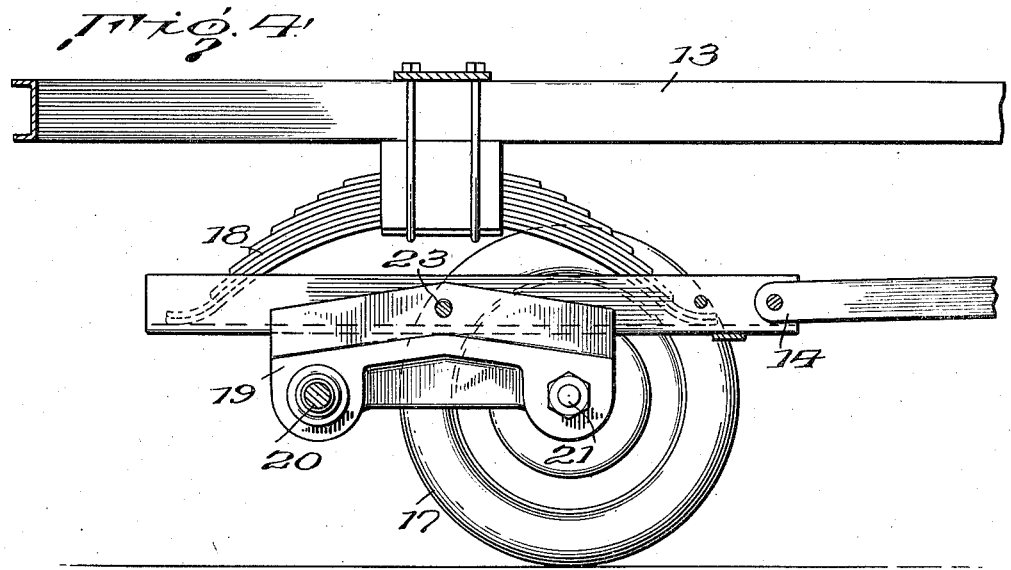
Fig. 4 is a longitudinal vertical sectional view on the line 4—4 of Fig. 3.
Figure 5:
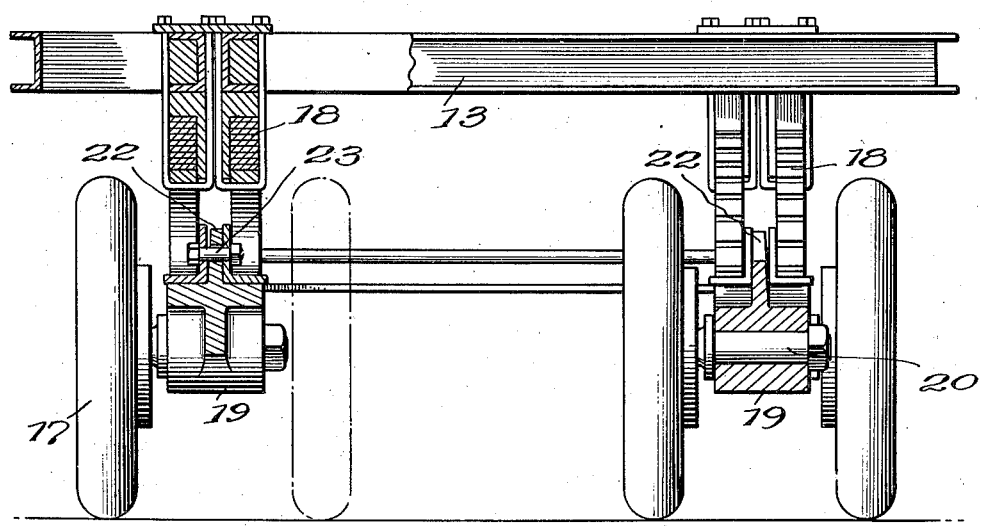
Fig. 5 is a transverse vertical sectional view on the line 5—5 of Fig. 3.

In order to permit the use of an unusually wide trailer body and, at the same time, maintain equilibrium of the trailer body, irrespective of road conditions, the rear section 14ª of the underframe is mounted on the wheel truck in such fashion as to obtain a more or less universal action just as the forward end of the trailer is mounted for universal movement with respect to the tractor frame. In the preferred form of the invention, the side members of the underframe 14ª are provided with blocks 19 pivotally supported thereon for rocking motion longitudinally of the frame, and each block is formed with axles 20, 21, at opposite sides thereof, fore and aft of the pivotal center of the block. Each axle is shown as having one or more ground wheels journaled thereon, but additional wheels may be used on each axle if desired. In this way, the blocks 19 may pivot fore and aft of the trailer body when the wheels encounter irregularities in the roadway over which the trailer is being drawn. The wheel blocks 19 are also adapted to rock, to a limited extent, transversely of the underframe and trailer body. Preferably, the side members of the underframe section 14ª are recessed, as by forming them of laterally spaced angle irons, and the blocks 19 are formed with a flange 22 extending upwardly therefrom into the recesses thus formed between the angle irons. Said flange 22 is formed with an opening through which the pivot pin 23 extends rather loosely and, as will be noted, particularly in Fig. 5, the flange is tapered upwardly so as to provide a clearance between the flange and the angle irons. Therefore, due to the looseness of the fit of pivot pin 23 in the apertures of the flanges and the tapering of the flanges themselves, the blocks 19 are free to rock laterally of the vehicle, the degree of rocking being limited to the clearance between the block and angle irons. Referring to Figs. 4 and 6, the upper surface of each block 19 is inclined longitudinally from the center thereof toward its ends and the degree of inclination of these surfaces determines the limit of the rocking movement of the block fore and aft of the trailer. As a consequence, the underframe 14, 14a, is mounted on the ground wheels 17 at the rear of the trailer, with a substantially universal action, because the blocks 19 are free to rock both longitudinally and laterally to the underframe and the trailer proper. In addition, this lateral play of the wheel-supporting blocks 19 tends to absorb thrusts that are imposed upon the trailer wheels, when the trailer is traveling curves or winding roads. Also, by the use of dual wheels on each wheel block, the body of the trailer may be made considerably wider and, by reason of the fact that the rocking motions of the wheel blocks are independent of movement of the trailer main frame 13, there is no danger of the body of increased width tipping or losing its equilibrium. That is, by the interpositioning of the springs 18 between the main frame 13 and the underframe, and the ability of the underframe to move relatively to the main frame, the rocking motions of the wheel truck and blocks 19 will have no effect whatever on the balance of the main frame.

In the construction illustrated in Figs. 7 to 11, the wheel blocks 19 are formed with the flange 22 for being pivoted on the underframe section 14a, as in the previous construction, but in this modification, the blocks are formed with depending lugs 24 at their opposite ends and each lug is provided with a bearing for a short shaft 25 whose ends project beyond the lugs. The projecting ends 25a of said shaft are of angular cross-section, squared in the present instance, and these squared ends are adapted to receive the axles 20, 21, the axles being formed with enlarged end portions 26 having square openings 27 therein for mounting on the ends of the shaft 25. In this construction the blocks 19 are capable of rocking fore and aft of the trailer due to the pivotal connection of flange 22 with the underframe, and the wheels by which each block is supported are free to rock as a unit transversely of the trailer by reason of the shaft 25 journaled in the lugs 24. This lateral rocking motion of the shaft 25 and axles 20, 21, is limited by the surfaces 28 on the enlargements 26 of the axles engaging against the under-surface of the blocks 19, said surface of the block being inclined as at 29 to cooperate with the surface 28.

If desired, means may be provided for guiding the rear end of the carriage underframe in its vertical movements relatively to the main frame 13. For instance, the underframe may be provided with depending bars 30 extending between the angles 14a at the rear of the underframe, said bars 30 slidably engaging the underframe whereby the latter may rise and fall with respect to the main frame 13 and be guided by said bars 30.

As before stated, this mounting of the wheels at the rear of the trailer on the underframe and the yielding connection between the rear end of the underframe and main frame together with the pivotal connection between the underframe sections and between the forward end of the underframe and the main frame, insures the body of the trailer proper maintaining its equilibrium under all ordinary road conditions which would otherwise cause a tilting of the rear of the usual trailer. Also, as before pointed out, by having the wheel blocks suspended, so to speak, below the underframe, and providing for the lateral rocking of the wheels, as a unit, with respect to their respective blocks, undue strains on the wheels and the wheel blocks and their connections with the underframe, due to lateral thrust, are eliminated.

What I claim is:

1. In a trailer vehicle, the combination of a body supporting frame, ground wheels for said body, and a mounting for said ground wheels comprising a truck block mounted directly in said frame, axles projecting from opposite sides of said block, each axle having a wheel journaled thereon, the connection between said frame and said block being such as to permit the block to rock longitudinally and laterally of said frame.

2. In a trailer vehicle, the combination of a body supporting frame, ground wheels for said body, and a mounting for said ground wheels comprising a truck block, axles projecting from opposite sides of said block, each axle having a wheel journaled thereon, said block being pivotally and loosely attached directly to the frame to permit rocking of said block longitudinally and laterally of the frame.

3. In a trailer vehicle, the combination of the side sill of a body supporting frame, a wheel mounting comprising a block pivotally mounted directly on said side sill to rock fore and aft and laterally of the sill, and ground wheels journaled on said block fore and aft of the pivotal center of the block.

4. In a trailer vehicle, the combination of the side sill of a body supporting frame, said sill having a vertical recess therein, an axle block below said sill, a flange on said block projecting upwardly into said recess, a pivot pin extending through the sill and projection transversely of the sill whereby said block can rock fore and aft of the frame, said block being loosely suspended on said pin and the cross-section of said flange being tapered upwardly whereby said block may tilt transversely of the sill, and ground wheels journaled on said block fore and aft of the pivotal center of the block.

5. In a trailer vehicle, the combination of the side sill of a body supporting frame, an axle block pivoted directly on said sill to rock fore and aft of the frame, a shaft journaled in said block and disposed longitudinally of the frame, axles fixed on said shaft fore and aft of the pivotal center of the block, ground wheels journaled on said axles, and an enlargement on each axle engageable with said block for limiting rotary motion of said shaft in said block.

CHARLES E. BRADSHAW.